(12) United States Patent  
Ting et al.

(10) Patent No.: US 12,555,545 B2
(45) Date of Patent: Feb. 17, 2026

(54) ELECTRONIC DEVICE

(71) Applicant: Innolux Corporation, Miaoli County (TW)

(72) Inventors: Chin-Lung Ting, Miaoli County (TW); Yi-Hung Lin, Miaoli County (TW); Kung-Chen Kuo, Miaoli County (TW); Po-Syun Chen, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 18/896,818

(22) Filed: Sep. 25, 2024

(65) Prior Publication Data

US 2025/0140205 A1 May 1, 2025

Related U.S. Application Data

(60) Provisional application No. 63/594,038, filed on Oct. 30, 2023.

(30) Foreign Application Priority Data

Jun. 21, 2024 (CN) .......................... 202410811062.4

(51) Int. Cl.
*G09G 3/3266* (2016.01)
*G06F 3/041* (2006.01)
*G09G 3/32* (2016.01)
*G09G 3/36* (2006.01)

(52) U.S. Cl.
CPC ....... *G09G 3/3266* (2013.01); *G06F 3/04166* (2019.05); *G09G 3/32* (2013.01); *G09G 3/3677* (2013.01); *G09G 2310/0267* (2013.01); *G09G 2310/0291* (2013.01)

(58) Field of Classification Search
CPC .............. G09G 2310/027; G09G 3/20; G09G 2310/0291; G09G 3/3266
See application file for complete search history.

(56) References Cited

U.S. PATENT DOCUMENTS

| 10,565,950 | B2 | 2/2020 | Zhao |
| 12,094,416 | B1* | 9/2024 | Chen .................. H10K 59/1213 |
| 2006/0244710 | A1 | 11/2006 | Iriguchi et al. |
| 2008/0174285 | A1* | 7/2008 | Morita ................. G09G 3/3655 |
| | | | 345/204 |
| 2020/0027387 | A1* | 1/2020 | Cheng ....................... G09G 3/20 |
| 2020/0111825 | A1* | 4/2020 | Yin ...................... H04N 23/743 |
| 2021/0090513 | A1* | 3/2021 | Takahashi ............ G09G 3/3659 |
| 2022/0172681 | A1* | 6/2022 | Kim ...................... G09G 3/3266 |
| 2024/0221587 | A1* | 7/2024 | Shen ...................... G09G 3/3677 |

* cited by examiner

*Primary Examiner* — Van N Chow
(74) *Attorney, Agent, or Firm* — JCIPRNET

(57) ABSTRACT

An electronic device is provided. The electronic device includes at least one electronic circuit, a scan line, and a scan signal conversion circuit. The scan line transmits a first scan signal. The scan signal conversion circuit is electrically connected to the at least one electronic circuit and the scan line. The scan signal conversion circuit receives the first scan signal, converts the first scan signal into a second scan signal, and provides the second scan signal to the at least one electronic circuit.

12 Claims, 16 Drawing Sheets

ELECTRONIC DEVICE

CROSS-REFERENCE TO RELATED APPLICATION

This application claims the priority benefit of U.S. provisional application Ser. No. 63/594,038, filed on Oct. 30, 2023, and China application serial no. 202410811062.4, filed on Jun. 21, 2024. The entirety of each of the above-mentioned patent applications is hereby incorporated by reference herein and made a part of this specification.

BACKGROUND

Technical Field

The disclosure relates to an electronic device, and more particularly, to an electronic device that may adjust a scan signal located on a scan line.

Description of Related Art

A current electronic device may include multiple electronic circuits. The electronic device may sequentially provide scan signals to the electronic circuits through the scan lines to drive the electronic circuits. The electronic circuits may be selected according to the scan signals located on the scan lines. The selected electronic circuit may operate according to a received data signal.

As resolution of the electronic device increases, a width of the scan line becomes shorter, and a length of the scan line becomes shorter, which makes the scan signal susceptible to delay or distortion due to a resistance value and/or a capacitance value associated with the scan line. Once the scan signal is significantly delayed or distorted, an operation of the electronic circuit may be abnormal.

SUMMARY

The disclosure relates to an electronic device that may adjust a scan signal located on a scan line.

According to an embodiment of the disclosure, an electronic device includes at least one electronic circuit, a scan line, and a scan signal conversion circuit. The scan line transmits a first scan signal. The scan signal conversion circuit is electrically connected to the at least one electronic circuit and the scan line. The scan signal conversion circuit receives the first scan signal, converts the first scan signal into a second scan signal, and provides the second scan signal to the at least one electronic circuit.

Based on the above, the scan signal conversion circuit converts the first scan signal into the second scan signal. The scan signal conversion circuit may adjust the first scan signal located on the scan line to the second scan signal. The electronic circuit receives the second scan signal. In this way, an operation of the electronic circuit is not abnormal due to delay or distortion of the first scan signal.

DETAILED DESCRIPTION OF DISCLOSED EMBODIMENTS

Figure 1:
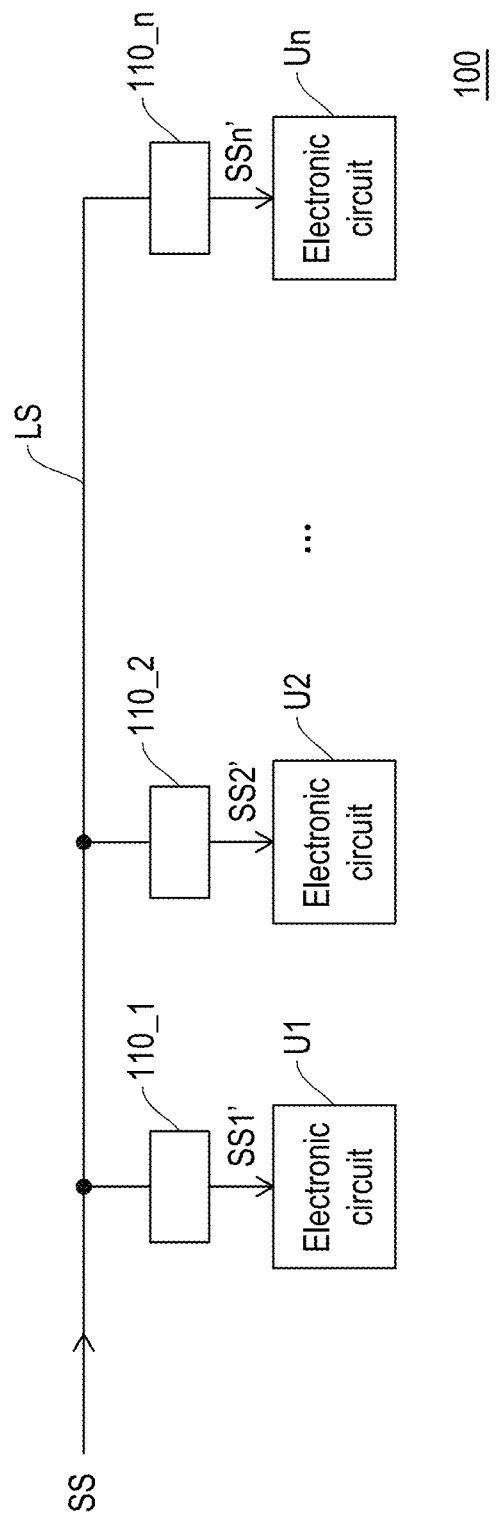
FIG. 1 is a schematic view of an electronic device according to an embodiment of the disclosure.

The disclosure can be understood by referring to the following detailed description in combination with the accompanying drawings. It should be noted that purposes of clear description and ease of understanding by the reader, each of drawings in this disclosure only depict a part of the electronic device, and the specific components in each of the drawings are not drawn according to scale. In addition, the number and size of each device in the drawings are only for exemplary purpose, and are not intended to limit the scope of the disclosure.

Throughout the disclosure and the appended claims, certain words are used to refer to specific components. Those skilled in the art should understand that electronic device manufacturers may refer to the same components by different names. The disclosure does not intend to distinguish those components with the same function but different names. In the following description and claims, the terms "contain", "include", and "have" are open-ended terms, so they should be interpreted as "include but not limited to . . . ". Therefore, when the terms "contain", "include" and/or "have" are used in the description of this disclosure, they specify the existence of a corresponding feature, region, step, operation, and/or component, but do not exclude the existence of one or more corresponding features, regions, steps, operations, and/or components.

It should be understood that when a component is described as being "coupled to", "connected to", or "conducted to" another component, the component may be directly connected to the another component and may establish a direct electrical connection, or there may be an intervening component between the components for relaying the electrical connection (indirect electrical connection). In contrast, when a component is described as being "directly coupled to", "directly conducted to", or "directly connected to" another component, there are no intervening components therebetween.

Although terms such as first, second, and third may be used to describe different components, the components are not limited by the terms. The terms are merely used to distinguish a component from other components in the specification. The same terms may not be used in the claims, but the terms first, second, third, etc. may be used with respect to a required order of the components. Therefore, in the following description, a first component may be a second component in the claims.

The electronic device in the disclosure may include a display device, an antenna device, a sensing device, a light emitting device, a touch display, a curved display, or a free shape display, but the disclosure is not limited thereto. The electronic device may include a bendable or flexible electronic device. The electronic device may include, for example, liquid crystals, light emitting diodes, quantum dots (QD), fluorescence, phosphor, other suitable display media, or a combination of the above materials, but the disclosure is not limited thereto. The light emitting diode may include, for example, an organic light emitting diode (OLED), a mini light emitting diode (mini LED), a micro light emitting diode (micro LED), or a quantum dot light emitting diode (quantum dot LED, which may include QLED and QDLED), or other suitable materials or a combination of the above, but the disclosure is not limited thereto. The display device may include, for example, a splicing display device, but the disclosure is not limited thereto. The antenna device may be, for example, a liquid crystal antenna, but the disclosure is not limited thereto. The antenna device may include, for example, an antenna splicing device, but the disclosure is not limited thereto. It should be noted that the electronic device may be any combination of the above arrangements, but the disclosure is not limited thereto. In addition, a shape of the electronic device may be rectangular, circular, polygonal, a shape with curved edges, or other suitable shapes. The electronic device may have peripheral systems such as a drive system, a control system, a light source system to support the display device, the antenna device, or a splicing device, but the disclosure is not limited thereto. The sensing device may include a camera, an infrared sensor, or a fingerprint sensor, etc., but the disclosure is not limited thereto. In some embodiments, the sensing device may further include a flash light, an infrared (IR) light source, other sensors, electronic circuits, or a combination of the above, but the disclosure is not limited thereto.

In the disclosure, an "electronic circuit", a "pixel", or a "pixel unit" are used as a unit for describing a specific region including at least one functional circuit for at least one specific function in the embodiments. An area of the "pixel" depends on a unit used to provide a specific function. The adjacent pixels may share the same portions or wires, but may also include specific portions thereof. For example, the adjacent pixels may share the same scan line or the same data line, but the pixels may further have a transistor or a capacitor thereof.

It should be noted that technical features in different embodiments described below may be replaced, reorganized, and mixed with each other to complete another embodiment without departing from the spirit of the disclosure.

Referring to FIG. 1, FIG. 1 is a schematic view of an electronic device according to an embodiment of the disclosure. In this embodiment, an electronic device 100 at least includes electronic circuits U1 to Un, a scan line LS, and scan signal conversion circuits 110_1 to 110_n. The scan line LS transmits a first scan signal SS. In this embodiment, the scan signal conversion circuit 110_1 is electrically connected to the scan line LS and the electronic circuit U1. The scan signal conversion circuit 110_2 is electrically connected to a scan line LS1 and the electronic circuit U2, and the rest may be derived by analogy.

In this embodiment, the scan signal conversion circuit 110_1 receives the first scan signal SS located on the scan line LS and converts the first scan signal SS into a second scan signal SS1'. The scan signal conversion circuit 110_1 provides the second scan signal SS1' to the electronic circuit U11. The scan signal conversion circuit 110_2 receives the first scan signal SS located on the scan line LS and converts the first scan signal SS into a second scan signal SS2'. The scan signal conversion circuit 110_2 provides the second scan signal SS2' to the electronic circuit U2. Similarly, the scan signal conversion circuit 110_n receives the first scan signal SS located on the scan line LS and converts the first scan signal SS into a second scan signal SSn'. The scan signal conversion circuit 110_n provides the second scan signal SSn' to the electronic circuit Un.

It is worth mentioning here that the scan signal conversion circuits 110_1 to 110_n may adjust the received first scan signal SS into the second scan signals SS1' to SSn'. The electronic circuits U1 to Un receive a corresponding one of the second scan signals SS1' to SSn'. In this way, an operation of the electronic circuits U1 to Un is not abnormal due to delay or distortion of the first scan signal SS.

In this embodiment, the electronic device 100 is a display device, an antenna device, a sensing device, a light emitting device, or a touch electronic device, but the disclosure is not limited thereto. The electronic circuits U1 to Un may be pixel circuits, touch units, or light emitting circuits respectively, but the disclosure is not limited thereto.

The number of scan lines in the disclosure may be one or more. The number of scan signal conversion circuits in the disclosure may be one or more. The number of scan signal conversion circuits in the disclosure may be changed correspondingly according to the number of scan lines. The disclosure is not limited to the number of electronic circuits, the number of scan lines, and the number of scan signal conversion circuits.

The following will describe an implementation example of the scan signal conversion circuit in the disclosure.

Figure 2:
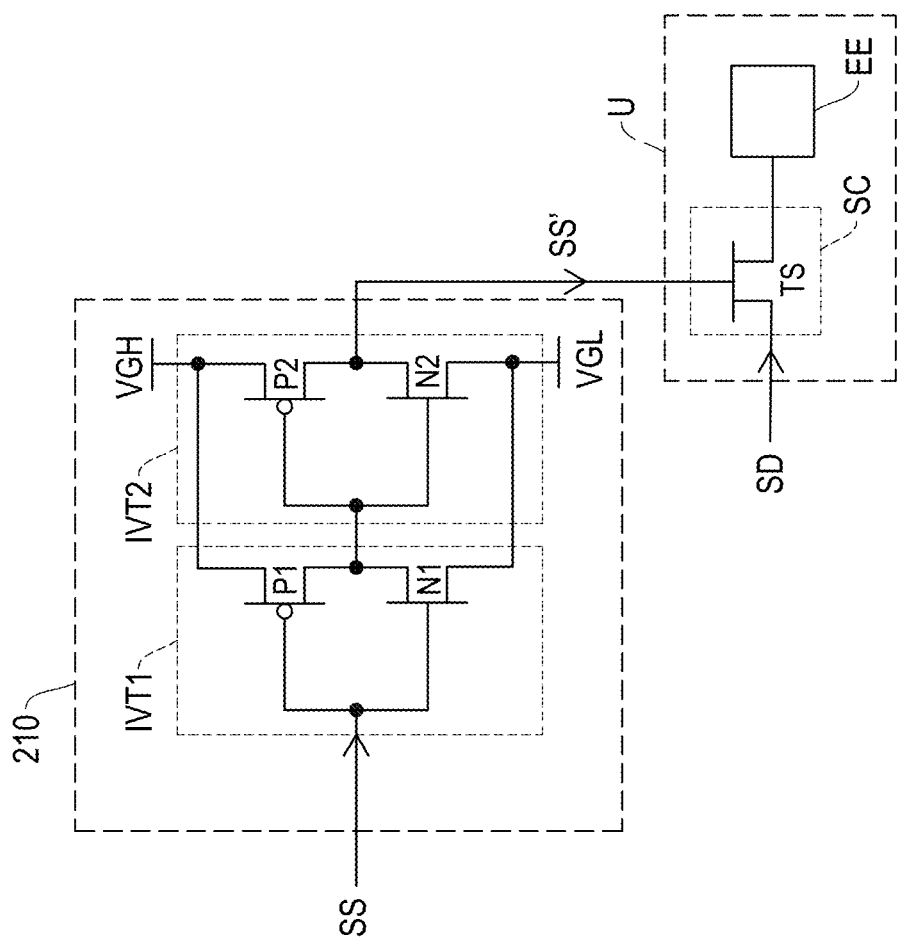
FIG. 2 is a schematic view of a scan signal conversion circuit and an electronic circuit according to an embodiment of the disclosure.

Referring to FIG. 2, FIG. 2 is a schematic view of a scan signal conversion circuit and an electronic circuit according to an embodiment of the disclosure. In this embodiment, a scan signal conversion circuit 210 includes a first inverter IVT1 and a second inverter IVT2. The first inverter IVT1 and the second inverter IVT2 are electrically connected in a manner of cascade. Specifically, an input end of the first inverter IVT1 receives the first scan signal SS. An input end of the second inverter IVT2 is electrically connected to an output end of the first inverter IVT1. An output end of the second inverter IVT2 is electrically connected to an electronic circuit U and outputs a second scan signal SS'. In this embodiment, the first inverter IVT1 is implemented by a first complementary metal oxide semiconductor (CMOS) circuit. The second inverter IVT2 is implemented by a second CMOS circuit.

In this embodiment, the first inverter IVT1 includes a P-type transistor P1 and an N-type transistor N1. A first end of the P-type transistor P1 is electrically connected to a reference high voltage VGH. A control end of the P-type transistor P1 receives the first scan signal SS. A first end of the N-type transistor N1 is electrically connected to a second end of the P-type transistor P1. A second end of the N-type transistor N1 is electrically connected to a reference low voltage VGL. A control end of the N-type transistor N1 receives the first scan signal SS.

The second inverter IVT2 includes a P-type transistor P2 and an N-type transistor N2. A first end of the P-type transistor P2 is electrically connected to the reference high voltage VGH. A second end of the P-type transistor P2 is electrically connected to the electronic circuit U. A control end of the P-type transistor P2 is electrically connected to the second end of the P-type transistor P1. A first end of the N-type transistor N2 is electrically connected to the second end of the P-type transistor P2. A second end of the N-type transistor N2 is electrically connected to the reference low voltage VGL. A control end of the N-type transistor N2 is electrically connected to the second end of the P-type transistor P1.

In this embodiment, the first inverter IVT1 may provide an inversion signal according to the first scan signal SS. The second inverter IVT2 may provide the second scan signal SS' according to the inversion signal.

Generally speaking, during a transmission process of the first scan signal SS, a waveform of the first scan signal SS changes according to a resistance value and/or a capacitance value of the scan line LS. Therefore, a rising edge and a falling edge of the first scan signal SS are delayed. After conversion of the first inverter IVT1 and the second inverter IVT2, delay of a rising edge and a delay of the falling edge of the second scan signal SS' are eliminated. In other words, the rising edge and the falling edge of the second scan signal SS' are reconstructed.

In this embodiment, the electronic circuit U includes an electronic element EE and a selection circuit SC. The selection circuit SC is electrically connected to the scan signal conversion circuit 210 and the electronic element EE. The selection circuit SC receives the second scan signal SS' and a data signal SD, and provides the data signal SD to the electronic element EE according to the second scan signal SS'. The electronic element EE operates according to the data signal SD.

In this embodiment, the selection circuit SC includes a selection transistor TS. A first end of the selection transistor TS receives the data signal SD. A second end of the selection transistor TS is electrically connected to the electronic element EE. A control end of the selection transistor TS receives the second scan signal SS'. For example, the selection transistor TS may be implemented by an N-type transistor. Therefore, when a voltage value of the second scan signal SS' is at a high voltage level, the selection transistor TS is turned on to transmit the data signal SD. The electronic element EE may receive the data signal SD through the selection transistor TS. When the voltage value of the second scan signal SS' is at a low voltage level, the selection transistor TS is turned off. In some embodiments, the selection transistor TS may be implemented by a P-type transistor.

In this embodiment, the data signal SD may be a voltage signal, a current signal, or a pulse-width modulation (PWM) signal. The electronic element EE may include a liquid crystal element, a light emitting element, or a modulation element. The modulation element may be a variable capacitor or a variable resistor.

In this embodiment, based on actual requirements, layout areas or aspect ratios of transistor channels of the P-type transistor P2 and the N-type transistor N2 may be adjusted. For example, in order to adjust impedance of the scan signal conversion circuit 210, the layout area or the aspect ratio of the transistor channel of the P-type transistor P2 may be greater than or equal to a layout area or an aspect ratio of a transistor channel of the P-type transistor P1. The layout area or the aspect ratio of the transistor channel of the N-type transistor N2 may be greater than or equal to a layout area or an aspect ratio of a transistor channel of the N-type transistor N1.

Figure 3:
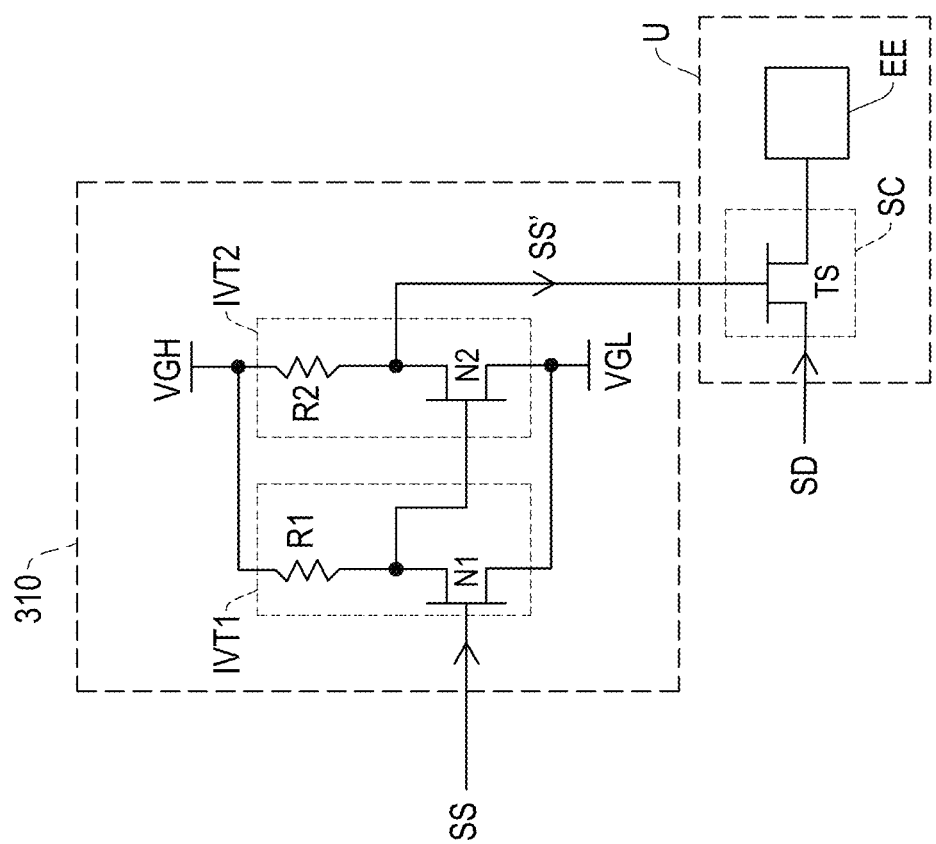
FIG. 3 is a schematic view of a scan signal conversion circuit and an electronic circuit according to an embodiment of the disclosure.

Referring to FIG. 3, FIG. 3 is a schematic view of a scan signal conversion circuit and an electronic circuit according to an embodiment of the disclosure. In this embodiment, a scan signal conversion circuit 310 includes the first inverter IVT1 and the second inverter IVT2. The first inverter IVT1 and the second inverter IVT2 are electrically connected in a manner of cascade. The first inverter IVT1 includes a resistor R1 and the N-type transistor N1. A first end of the resistor R1 is electrically connected to the reference high voltage VGH. The first end of the N-type transistor N1 is electrically connected to a second end of the resistor R1. The second end of the N-type transistor N1 is electrically connected to the reference low voltage VGL. The control end of the N-type transistor N1 receives the first scan signal SS.

The second inverter IVT2 includes a resistor R2 and the N-type transistor N2. A first end of the resistor R2 is electrically connected to the reference high voltage VGH. The first end of the N-type transistor N2 is electrically connected to a second end of the resistor R2 and the output end of the second inverter IVT2. The second end of the N-type transistor N2 is electrically connected to the reference low voltage VGL. The control end of the N-type transistor N2 is electrically connected to the first end of the N-type transistor N1.

In this embodiment, operations of the first inverter IVT1 and the second inverter IVT2 are similar to those in the embodiment of FIG. 2, and thus will not be repeated in the following.

In this embodiment, implementation details of the electronic circuit U have been clearly described in the embodiment of FIG. 2, and thus will not be repeated in the following.

Figure 4:
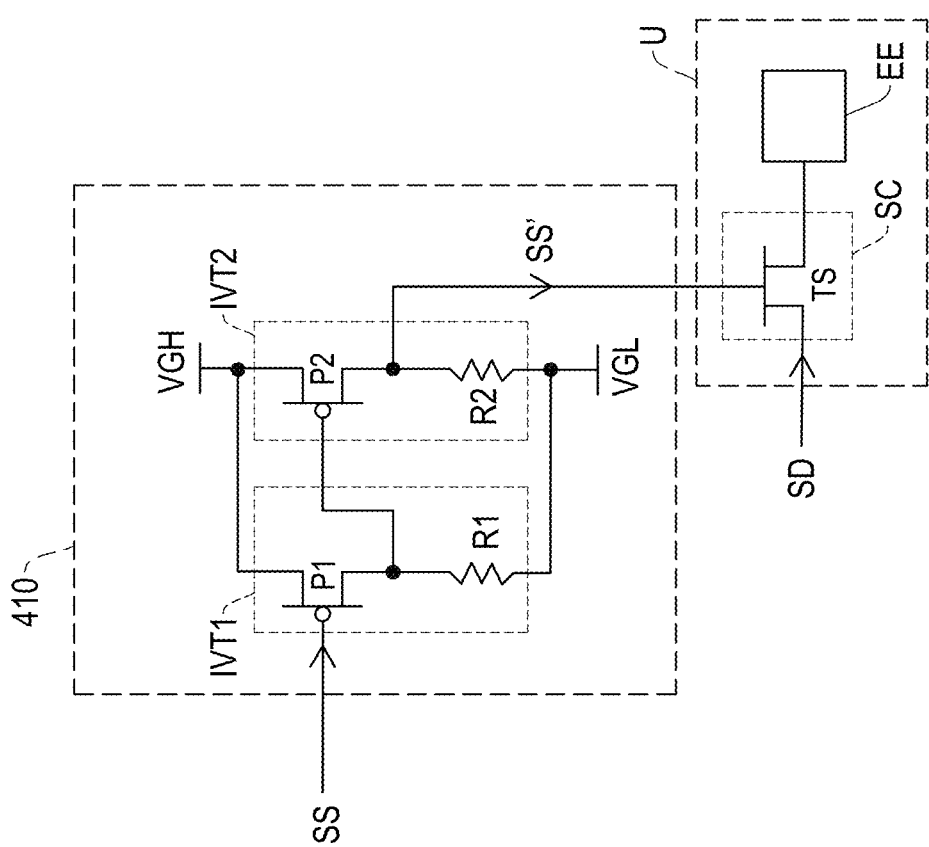
FIG. 4 is a schematic view of a scan signal conversion circuit and an electronic circuit according to an embodiment of the disclosure.

Referring to FIG. 4, FIG. 4 is a schematic view of a scan signal conversion circuit and an electronic circuit according to an embodiment of the disclosure. In this embodiment, a scan signal conversion circuit 410 includes the first inverter IVT1 and the second inverter IVT2. The first inverter IVT1 and the second inverter IVT2 are electrically connected in a manner of cascade. The first inverter IVT1 includes the P-type transistor P1 and the resistor R1. The first end of the P-type transistor P1 is electrically connected to the reference high voltage VGH. The control end of the P-type transistor P1 receives the first scan signal SS. The resistor R1 is electrically connected between the second end of the P-type transistor P1 and the reference low voltage VGL. The second inverter IVT2 includes the P-type transistor P2 and the resistor R2. The first end of the P-type transistor P2 is electrically connected to the reference high voltage VGH. The second end of the P-type transistor P2 is electrically connected to the output end of the second inverter IVT2. The control end of the P-type transistor P2 is electrically connected to the second end of the P-type transistor P1. The resistor R2 is electrically connected between the second end of the P-type transistor P2 and the reference low voltage VGL.

In this embodiment, the operations of the first inverter IVT1 and the second inverter IVT2 are similar to those in the embodiment of FIG. 2, and thus will not be repeated in the following.

In this embodiment, the implementation details of the electronic circuit U have been clearly described in the embodiment of FIG. 2, and thus will not be repeated in the following.

Figure 5:
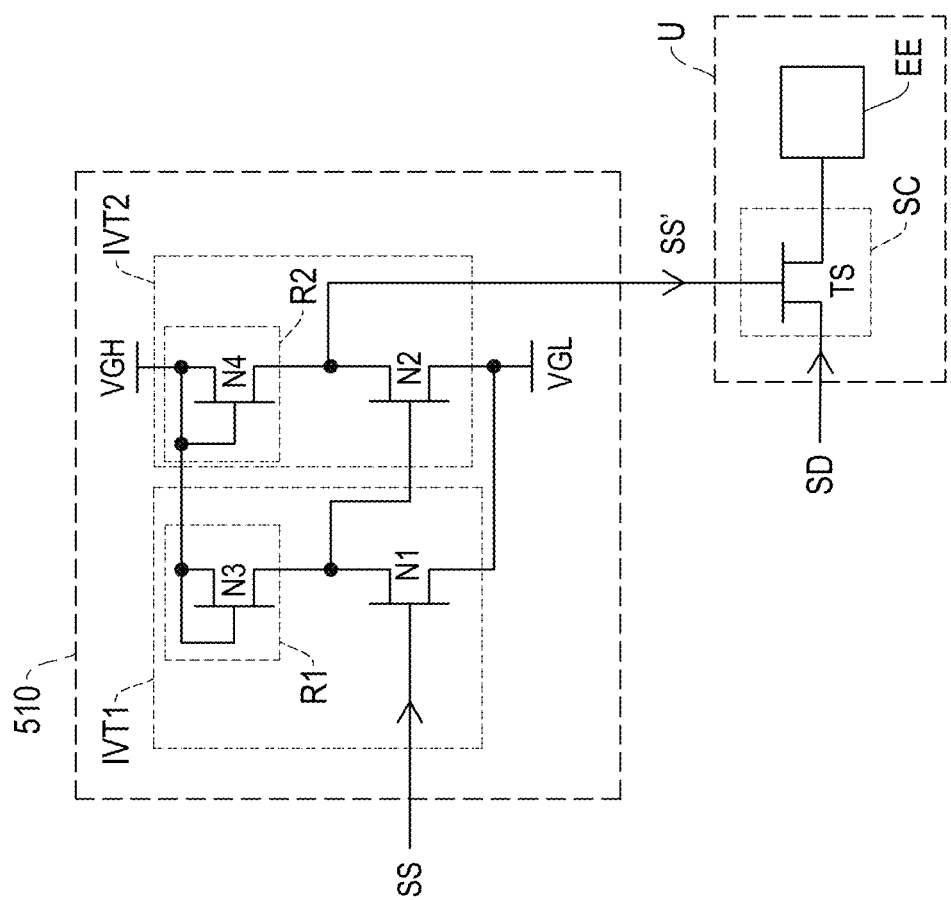
FIG. 5 is a schematic view of a scan signal conversion circuit and an electronic circuit according to an embodiment of the disclosure.

Referring to FIG. 5, FIG. 5 is a schematic view of a scan signal conversion circuit and an electronic circuit according to an embodiment of the disclosure. In this embodiment, a scan signal conversion circuit 510 includes the first inverter IVT1 and the second inverter IVT2. The first inverter IVT1 and the second inverter IVT2 are electrically connected in a manner of cascade. The first inverter IVT1 includes the resistor R1 and the N-type transistor N1. The first end of the resistor R1 is electrically connected to the reference high voltage VGH. The first end of the N-type transistor N1 is electrically connected to the second end of the resistor R1. The second end of the N-type transistor N1 is electrically connected to the reference low voltage VGL, and the control end of the N-type transistor N1 receives the first scan signal SS.

In this embodiment, the resistor R1 includes an N-type transistor N3. A first end of the N-type transistor N3 is electrically connected to a control end of the N-type transistor N3 and the reference high voltage VGH. A second end of the N-type transistor N3 is electrically connected to the first end of the N-type transistor N1. In other words, the N-type transistor N3 is electrically connected between the reference high voltage VGH and the first end of the N-type transistor N1 in a manner of diode connection.

The second inverter IVT2 includes the resistor R2 and the N-type transistor N2. The first end of the resistor R2 is electrically connected to the reference high voltage VGH. The first end of the N-type transistor N2 is electrically connected to the second end of the resistor R2. The second end of the N-type transistor N2 is electrically connected to the reference low voltage VGL, and the control end of the N-type transistor N2 receives the first scan signal SS.

In this embodiment, the resistor R2 includes an N-type transistor N4. A first end of the N-type transistor N4 is electrically connected to a control end of the N-type transistor N4 and the reference high voltage VGH. A second end of the N-type transistor N4 is electrically connected to the first end of the N-type transistor N2. In other words, the N-type transistor N4 is electrically connected between the reference high voltage VGH and the first end of the N-type transistor N2 in a manner of diode connection.

In this embodiment, the operations of the first inverter IVT1 and the second inverter IVT2 are similar to those in the embodiment of FIG. 2, and thus will not be repeated in the following.

In this embodiment, the implementation details of the electronic circuit U have been clearly described in the embodiment of FIG. 2, and thus will not be repeated in the following.

Figure 6:
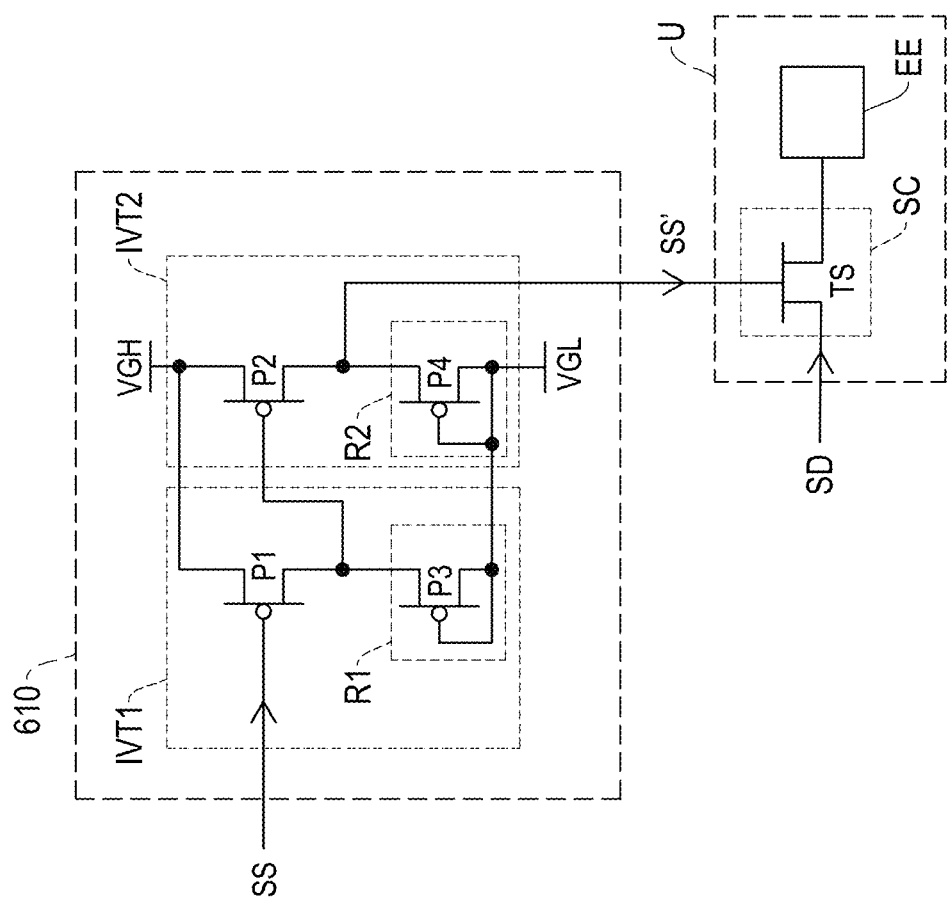
FIG. 6 is a schematic view of a scan signal conversion circuit and an electronic circuit according to an embodiment of the disclosure.

Referring to FIG. 6, FIG. 6 is a schematic view of a scan signal conversion circuit and an electronic circuit according to an embodiment of the disclosure. In this embodiment, a scan signal conversion circuit 610 includes the first inverter IVT1 and the second inverter IVT2. The first inverter IVT1 and the second inverter IVT2 are electrically connected in a manner of cascade. The first inverter IVT1 includes the P-type transistor P1 and the resistor R1. The first end of the P-type transistor P1 is electrically connected to the reference high voltage VGH. The control end of the P-type transistor P1 receives the first scan signal SS. The resistor R1 is electrically connected between the second end of the P-type transistor P1 and the reference low voltage VGL.

In this embodiment, the resistor R1 includes a P-type transistor P3. A first end of the P-type transistor P3 is electrically connected to the second end of the P-type transistor P1. A second end of the P-type transistor P3 is electrically connected to a control end of the P-type transistor P3 and the reference low voltage VGL. In other words, the P-type transistor P3 is electrically connected between the second end of the P-type transistor P1 and the reference low voltage VGL in a manner of diode connection.

The second inverter IVT2 includes the P-type transistor P2 and the resistor R2. The first end of the P-type transistor P2 is electrically connected to the reference high voltage VGH. The second end of the P-type transistor P2 is electrically connected to the output end of the second inverter IVT2. The control end of the P-type transistor P2 is electrically connected to the second end of the P-type transistor P1. The resistor R2 is electrically connected between the second end of the P-type transistor P2 and the reference low voltage VGL.

In this embodiment, the resistor R2 includes a P-type transistor P4. A first end of the P-type transistor P4 is electrically connected to the second end of the P-type transistor P2. A second end of the P-type transistor P4 is electrically connected to a control end of the P-type transistor P4 and the reference low voltage VGL. In other words, the P-type transistor P4 is electrically connected between the second end of the P-type transistor P2 and the reference low voltage VGL in a manner of diode connection.

In this embodiment, the operations of the first inverter IVT1 and the second inverter IVT2 are similar to those in the embodiment of FIG. 2, and thus will not be repeated in the following.

In this embodiment, the implementation details of the electronic circuit U have been clearly described in the embodiment of FIG. 2, and thus will not be repeated in the following.

Figure 7:
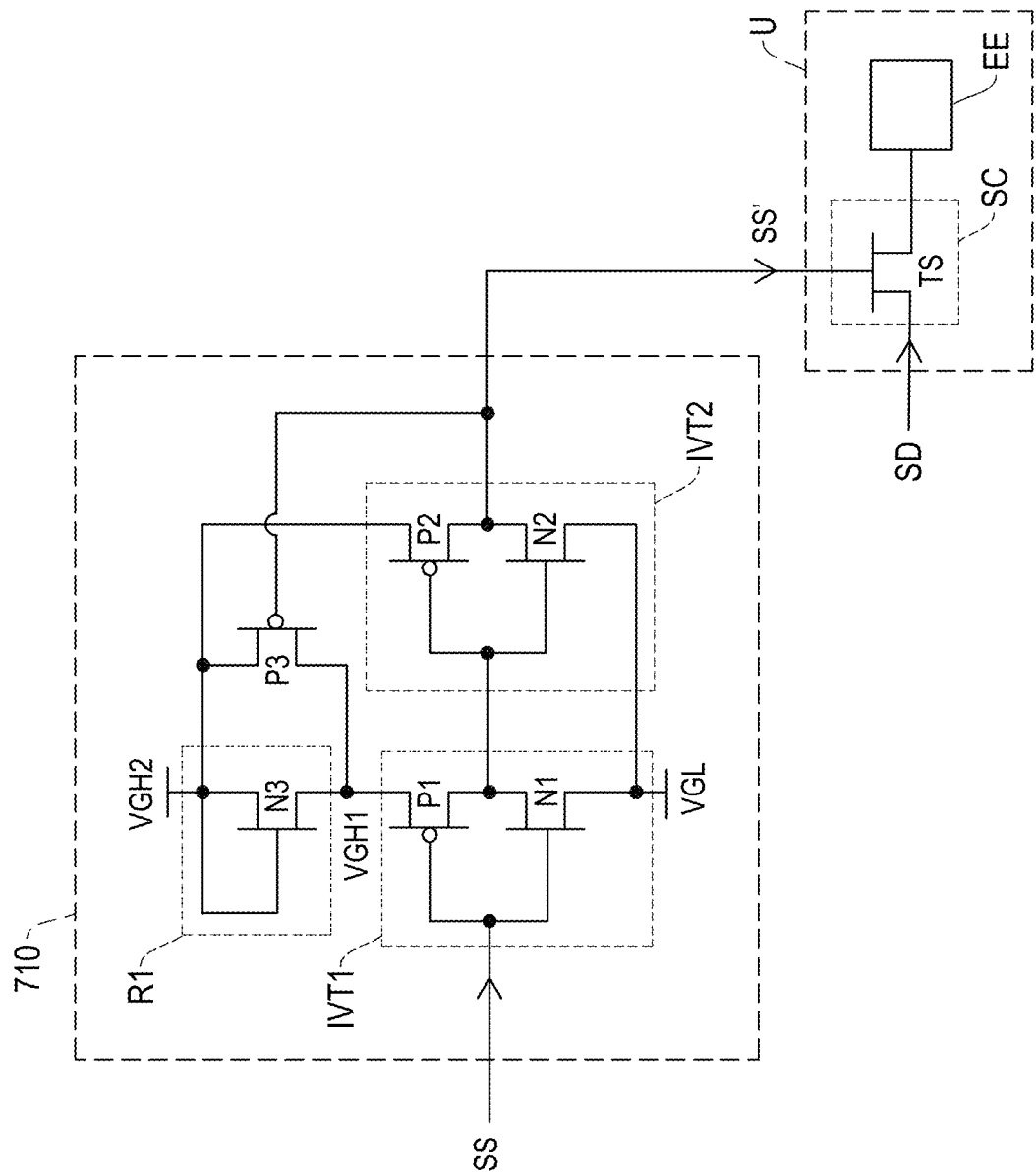
FIG. 7 is a schematic view of a scan signal conversion circuit and an electronic circuit according to an embodiment of the disclosure.

Referring to FIG. 7, FIG. 7 is a schematic view of a scan signal conversion circuit and an electronic circuit according to an embodiment of the disclosure. In this embodiment, a scan signal conversion circuit 710 may be implemented by a level shifter. The scan signal conversion circuit 710 includes the first inverter IVT1, the second inverter IVT2, the resistor R1, and the P-type transistor P3.

In this embodiment, the input end of the first inverter IVT1 receives the first scan signal SS. The input end of the second inverter IVT2 is electrically connected to the output end of the first inverter IVT1. The output end of the second inverter IVT2 is electrically connected to the electronic circuit U and outputs the second scan signal SS'. The first inverter IVT1 is implemented by the first complementary metal oxide semiconductor (CMOS) circuit. The second inverter IVT2 is implemented by the second CMOS circuit. The resistor R1 is electrically connected between the reference high voltage VGH2 and a high voltage end of the first inverter IVT1. The first end of the P-type transistor P3 is electrically connected to the reference high voltage VGH2. The second end of the P-type transistor P3 is electrically connected to the high voltage end of the first inverter IVT1. The control end of the P-type transistor P3 is electrically connected to the output end of the second inverter IVT2.

In this embodiment, the resistor R1 includes the N-type transistor N3. The first end of the N-type transistor N3 is electrically connected to the control end of the N-type transistor N3 and the reference high voltage VGH2. The second end of the N-type transistor N3 is electrically connected to the high voltage end of the first inverter IVT1. In other words, the N-type transistor N3 is electrically connected between the reference high voltage VGH2 and the high voltage end of the first inverter IVT1 in a manner of diode connection.

In this embodiment, the first inverter IVT1 includes the P-type transistor P1 and the N-type transistor N1. The first end of the P-type transistor P1 serves as the high voltage end of the first inverter IVT1 and is electrically connected to the second end of the N-type transistor N3. The control end of the P-type transistor P1 receives the first scan signal SS. The first end of the N-type transistor N1 is electrically connected to the second end of the P-type transistor P1. The second end of the N-type transistor N1 is electrically connected to the reference low voltage VGL. The control end of the N-type transistor N1 receives the first scan signal SS.

The second inverter IVT2 includes the P-type transistor P2 and the N-type transistor N2. The first end of the P-type transistor P2 is electrically connected to the reference high voltage VGH2. The second end of the P-type transistor P2 is electrically connected to the electronic circuit U and the control end of the P-type transistor P3. The control end of the P-type transistor P2 is electrically connected to the second end of the P-type transistor P1. The first end of the N-type transistor N2 is electrically connected to the second end of the P-type transistor P2. The second end of the N-type transistor N2 is electrically connected to the reference low voltage VGL. The control end of the N-type transistor N2 is electrically connected to the second end of the P-type transistor P1.

In this embodiment, the resistor R1 provides a reference high voltage VGH1 to the high voltage end (i.e., the first end of the P-type transistor P1) of the first inverter IVT1. A voltage value of the reference high voltage VGH1 is lower than a voltage value of the reference high voltage VGH2. When a voltage value of the first scan signal SS is at the low voltage level, the voltage value of the second scan signal SS' is at the low voltage level. The P-type transistor P3 is turned on. At this time, a voltage value at the first end of the P-type transistor P1 is substantially equal to the reference high voltage VGH2.

On the other hand, when the voltage value of the first scan signal SS is at the high voltage level, the voltage value of the second scan signal SS' is at the high voltage level. The P-type transistor P3 is turned off. At this time, the voltage value at the first end of the P-type transistor P1 drops from the reference high voltage VGH2 to the reference high voltage VGH1. Therefore, when the voltage value of the first scan signal SS is at the high voltage level, the voltage value at the first end of the P-type transistor P1 is reduced. In this way, the scan signal conversion circuit 710 may effectively turn off the P-type transistor P1.

In this embodiment, the implementation details of the electronic circuit U have been clearly described in the embodiment of FIG. 2, and thus will not be repeated in the following.

Figure 8:
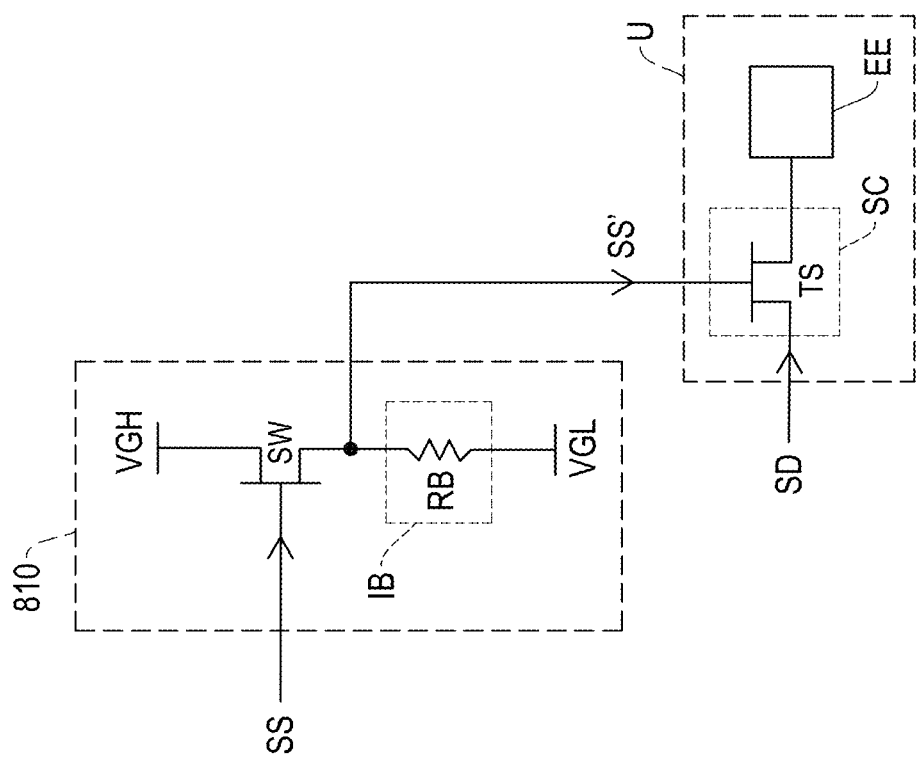
FIG. 8 is a schematic view of a scan signal conversion circuit and an electronic circuit according to an embodiment of the disclosure.

Referring to FIG. 8, FIG. 8 is a schematic view of a scan signal conversion circuit and an electronic circuit according to an embodiment of the disclosure. In this embodiment, a scan signal conversion circuit 810 may be implemented by an analog buffer. The scan signal conversion circuit 810 includes a switch SW and a current source IB. A first end of the switch SW is electrically connected to the reference high voltage VGH. A second end of the switch SW is electrically connected to the electronic circuit U. A control end of the switch SW receives the first scan signal SS. The current source IB is electrically connected between the second end of the switch SW and the reference low voltage VGL.

In this embodiment, when the voltage value of the first scan signal SS is a high voltage value, the switch SW is turned on. The second end of the switch SW outputs the second scan signal SS' having the high voltage value. When the voltage value of the first scan signal SS is a low voltage value, the switch SW is turned off. The second end of the switch SW outputs the second scan signal SS' having the low voltage value. In this embodiment, the switch SW may be implemented by the N-type transistor.

In this embodiment, the current source IB includes a resistor RB. The resistor RB is electrically connected between the second end of the switch SW and the reference low voltage VGL.

In this embodiment, the implementation details of the electronic circuit U have been clearly described in the embodiment of FIG. 2, and thus will not be repeated in the following.

Figure 9:
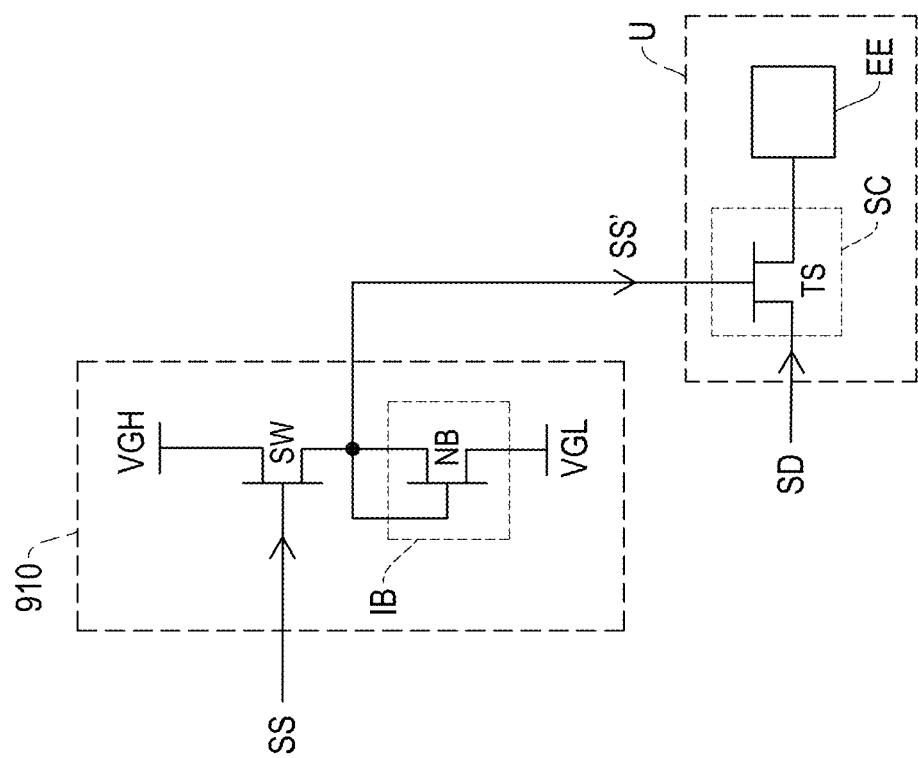
FIG. 9 is a schematic view of a scan signal conversion circuit and an electronic circuit according to an embodiment of the disclosure.

Referring to FIG. 9, FIG. 9 is a schematic view of a scan signal conversion circuit and an electronic circuit according to an embodiment of the disclosure. In this embodiment, a scan signal conversion circuit 910 may be implemented by the analog buffer. The scan signal conversion circuit 910 includes the switch SW and the current source IB. The first end of the switch SW is electrically connected to the reference high voltage VGH. The second end of the switch SW is electrically connected to the electronic circuit U. The control end of the switch SW receives the first scan signal SS. The current source IB is electrically connected between the second end of the switch SW and the reference low voltage VGL.

In this embodiment, when the voltage value of the first scan signal SS is the high voltage value, the switch SW is turned on. The second end of the switch SW outputs the second scan signal SS' having the high voltage value. When the voltage value of the first scan signal SS is the low voltage value, the switch SW is turned off. The second end of the switch SW outputs the second scan signal SS' having the low voltage value. In this embodiment, the switch SW may be implemented by the N-type transistor.

In this embodiment, the current source IB includes an N-type transistor NB. A first end of the N-type transistor NB is electrically connected to a control end of the N-type transistor NB and the second end of the switch SW. A second end of the N-type transistor NB is electrically connected to the reference low voltage VGL.

In this embodiment, the implementation details of the electronic circuit U have been clearly described in the embodiment of FIG. 2, and thus will not be repeated in the following.

Figure 10:
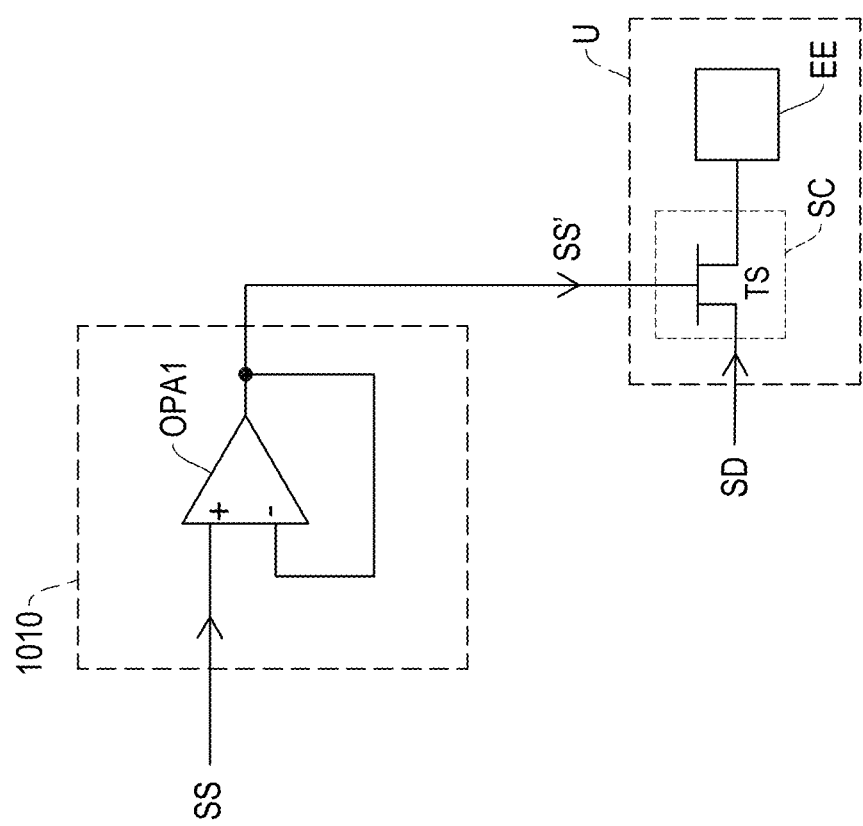
FIG. 10 is a schematic view of a scan signal conversion circuit and an electronic circuit according to an embodiment of the disclosure.

Referring to FIG. 10, FIG. 10 is a schematic view of a scan signal conversion circuit and an electronic circuit according to an embodiment of the disclosure. In this embodiment, a scan signal conversion circuit 1010 may be implemented by the analog buffer. The scan signal conversion circuit 1010 includes an operational amplifier OPA1. A first input end of the operational amplifier OPA1 receives the first scan signal SS. A second input end of the operational amplifier OPA1 is electrically connected to an output end of the operational amplifier OPA1 and the electronic circuit U. In this embodiment, the scan signal conversion circuit 1010 may be a unity gain buffer or a follower. The first input end of the operational amplifier OPA1 is a non-inverting input end (+). The second input end of the operational amplifier OPA1 is an inverting input end (−).

In this embodiment, the implementation details of the electronic circuit U have been clearly described in the embodiment of FIG. 2, and thus will not be repeated in the following.

Figure 11:
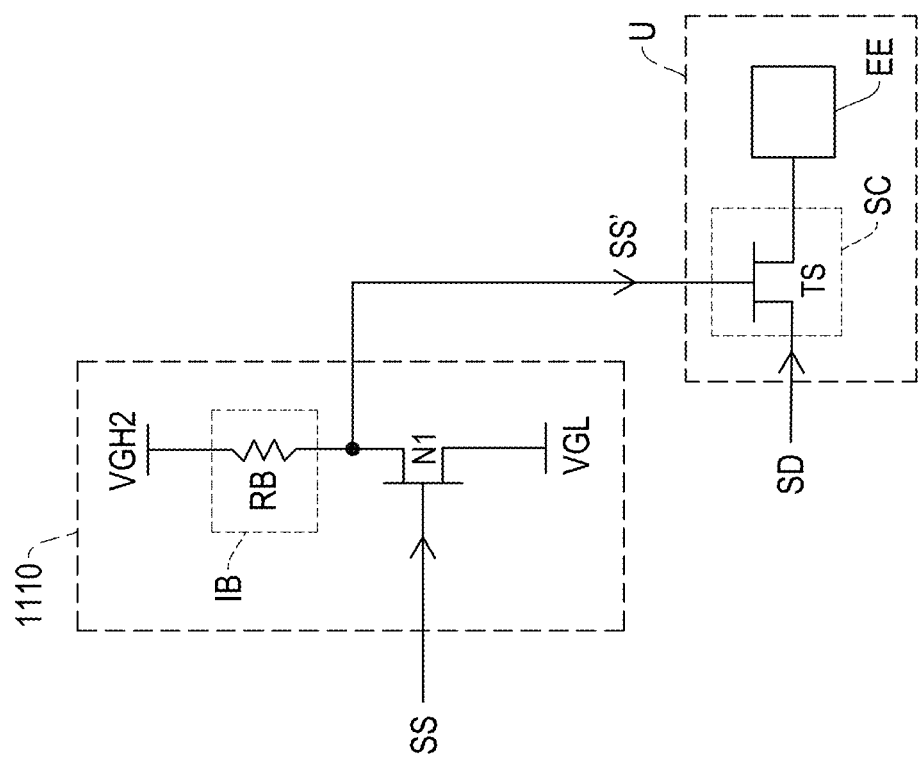
FIG. 11 is a schematic view of a scan signal conversion circuit and an electronic circuit according to an embodiment of the disclosure.

Referring to FIG. 11, FIG. 11 is a schematic view of a scan signal conversion circuit and an electronic circuit according to an embodiment of the disclosure. In this embodiment, a scan signal conversion circuit 1110 may be implemented by an analog amplifier. The scan signal conversion circuit 1110 includes the switch SW and the current source IB. The first end of the switch SW is electrically connected to the electronic circuit U. The second end of the switch SW is electrically connected to the reference low voltage VGL. The control end of the switch SW receives the first scan signal SS. The current source IB is electrically connected between the reference high voltage VGH2 and the first end of the switch SW.

In this embodiment, when the voltage value of the first scan signal SS is the high voltage value, the switch SW is turned on. The first end of the switch SW outputs the second scan signal SS' having the low voltage value. When the voltage value of the first scan signal SS is the low voltage value, the switch SW is turned off. The second end of the switch SW outputs the second scan signal SS' having the high voltage value. At this time, the high voltage value of the second scan signal SS' is substantially equal to the voltage value of the reference high voltage VGH2. Therefore, the high voltage value of the second scan signal SS' may be amplified to the voltage value of the reference high voltage VGH2. In this embodiment, the switch SW may be implemented by the N-type transistor. The voltage value of the reference high voltage VGH2 may be adjusted according to the actual requirements.

It should be noted that a phase of the second scan signal SS' in FIG. 2 to FIG. 10 is similar to a phase of the first scan signal SS. In this embodiment, the phase of the second scan signal SS' is opposite to the phase of the first scan signal SS.

In this embodiment, the current source IB includes the resistor RB. The resistor RB is electrically connected between the reference low voltage VGH and the first end of the switch SW.

In this embodiment, the implementation details of the electronic circuit U have been clearly described in the embodiment of FIG. 2, and thus will not be repeated in the following.

Figure 12:
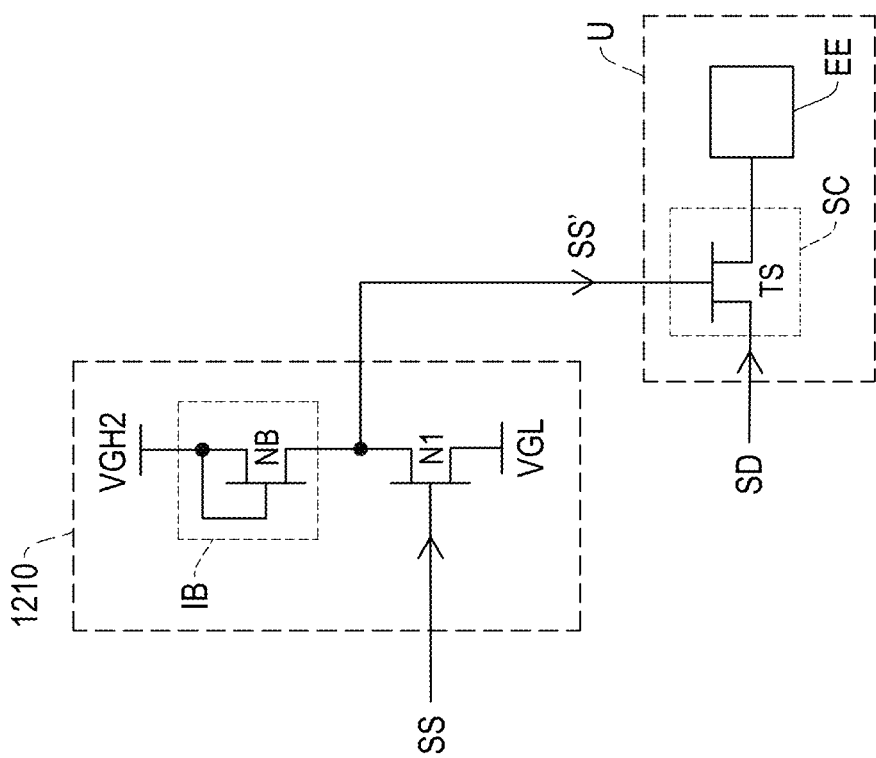
FIG. 12 is a schematic view of a scan signal conversion circuit and an electronic circuit according to an embodiment of the disclosure.

Referring to FIG. 12, FIG. 12 is a schematic view of a scan signal conversion circuit and an electronic circuit according to an embodiment of the disclosure. In this embodiment, a scan signal conversion circuit 1210 may be implemented by the analog amplifier. The scan signal conversion circuit 1210 includes the switch SW and the current source IB. The first end of the switch SW is electrically connected to the electronic circuit U. The second end of the switch SW is electrically connected to the reference low voltage VGL. The control end of the switch SW receives the first scan signal SS. The current source IB is electrically connected between the reference high voltage VGH2 and the first end of the switch SW.

In this embodiment, when the voltage value of the first scan signal SS is the high voltage value, the switch SW is turned on. The first end of the switch SW outputs the second scan signal SS' having the low voltage value. When the voltage value of the first scan signal SS is the low voltage value, the switch SW is turned off. The second end of the switch SW outputs the second scan signal SS' having the high voltage value. At this time, the high voltage value of the second scan signal SS' is substantially equal to the voltage value of the reference high voltage VGH2. Therefore, the high voltage value of the second scan signal SS' may be amplified to the voltage value of the reference high voltage VGH2. In this embodiment, the switch SW may be implemented by the N-type transistor.

In this embodiment, the phase of the second scan signal SS' is opposite to the phase of the first scan signal SS.

In this embodiment, the current source IB includes the N-type transistor NB. The first end of the N-type transistor NB is electrically connected to the control end of the N-type transistor NB and the reference high voltage VGH. The second end of the N-type transistor NB is electrically connected to the second end of the switch SW.

In this embodiment, the implementation details of the electronic circuit U have been clearly described in the embodiment of FIG. 2, and thus will not be repeated in the following.

Figure 13:
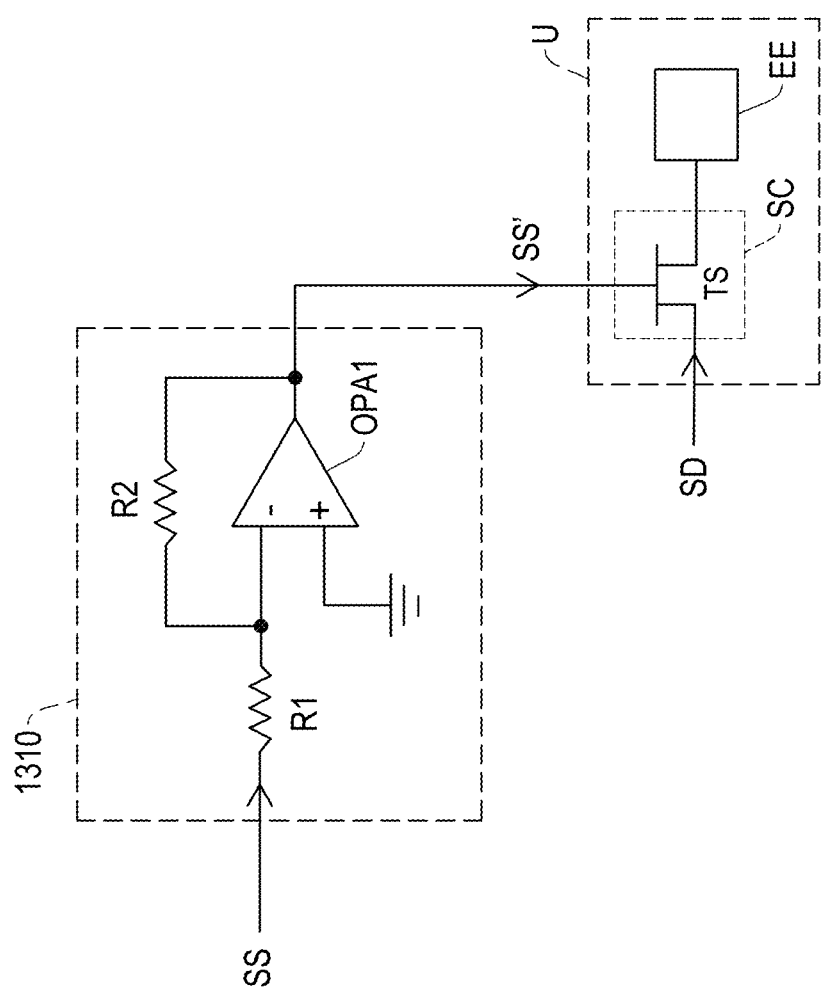
FIG. 13 is a schematic view of a scan signal conversion circuit and an electronic circuit according to an embodiment of the disclosure.

Referring to FIG. 13, FIG. 13 is a schematic view of a scan signal conversion circuit and an electronic circuit according to an embodiment of the disclosure. In this embodiment, a scan signal conversion circuit 1310 may be implemented by the analog amplifier. The scan signal conversion circuit 1310 includes the operational amplifier OPA1 and the resistors R1 and R2. The first end of the resistor R1 receives the first scan signal SS. The first input end of the operational amplifier OPA1 is electrically connected to the second end of the resistor R1. The second input end of the operational amplifier OPA1 is electrically connected to a reference low voltage (e.g., ground). The output end of the operational amplifier OPA1 is electrically connected to the electronic circuit U. The resistor R2 is electrically connected between the first input end of the operational amplifier OPA1 and the output end of the operational amplifier OPA1.

In this embodiment, the first input end of the operational amplifier OPA1 is the inverting input end (−). The second input end of the operational amplifier OPA1 is the non-inverting input end (+). The scan signal conversion circuit 1310 may gain the voltage value of the first scan signal SS according to a resistance value of the resistor R1 and a resistance value of the resistor R2 to generate the second scan signal SS'. In this embodiment, the voltage value of the second scan signal SS' may be (−r2/r1) times that of the first scan signal SS, where "r1" is the resistance value of the resistor R1, and "r2" is the resistance value of the resistor R2. Therefore, the phase of the second scan signal SS' in this embodiment is opposite to the phase of the first scan signal SS.

The resistance value of the resistor R1 and the resistance value of the resistor R2 may be adjusted according to the actual requirements.

In this embodiment, the implementation details of the electronic circuit U have been clearly described in the embodiment of FIG. 2, and thus will not be repeated in the following.

Figure 14:
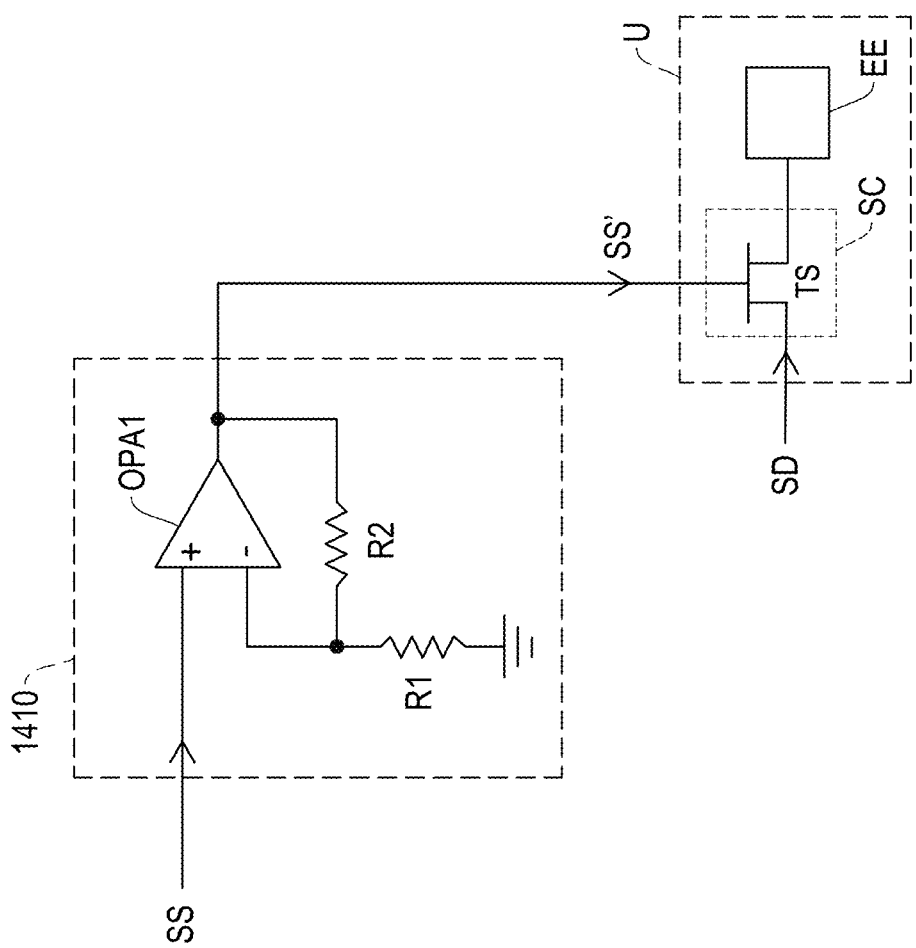
FIG. 14 is a schematic view of a scan signal conversion circuit and an electronic circuit according to an embodiment of the disclosure.

Referring to FIG. 14, FIG. 14 is a schematic view of a scan signal conversion circuit and an electronic circuit according to an embodiment of the disclosure. In this embodiment, a scan signal conversion circuit 1410 may be implemented by the analog amplifier. The scan signal conversion circuit 1410 includes the operational amplifier OPA1 and the resistors R1 and R2. The first input end of the operational amplifier OPA1 receives the first scan signal SS. The output end of the operational amplifier OPA1 is electrically connected to the electronic circuit U. The resistor R1 is electrically connected between the second input end of the operational amplifier OPA1 and the reference low voltage VGL. The resistor R2 is electrically connected between the second input end of the operational amplifier OPA1 and the output end of the operational amplifier OPA1.

In this embodiment, the first input end of the operational amplifier OPA1 is the non-inverting input end (+). The second input end of the operational amplifier OPA1 is the inverting input end (−). The scan signal conversion circuit 1410 may gain the voltage value of the first scan signal SS according to the resistance value of the resistor R1 and the resistance value of the resistor R2 to generate the second scan signal SS'. In this embodiment, the voltage value of the second scan signal SS' may be (1+(r2/r1)) times that of the first scan signal SS, where "r1" is the resistance value of the resistor R1, and "r2" is the resistance value of the resistor R2. Therefore, the phase of the second scan signal SS' in this embodiment is opposite to the phase of the first scan signal SS.

The resistance value of the resistor R1 and the resistance value of the resistor R2 may be adjusted according to the actual requirements.

In this embodiment, the implementation details of the electronic circuit U have been clearly described in the embodiment of FIG. 2, and thus will not be repeated in the following.

Figure 15:
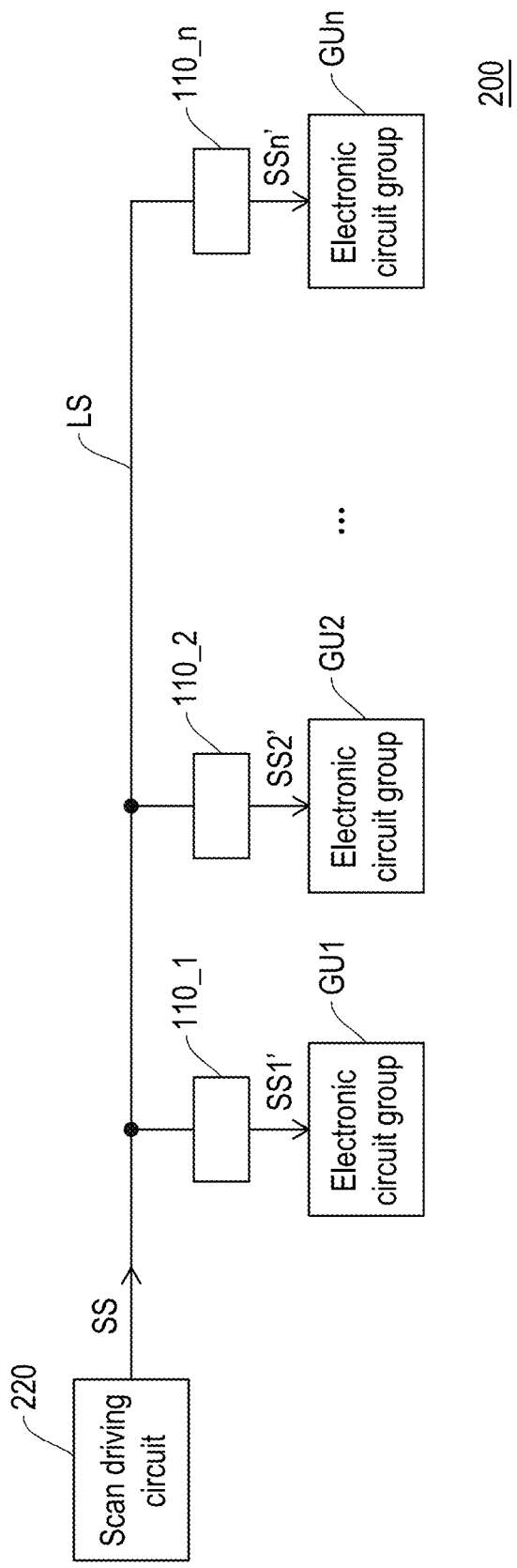
FIG. 15 is a schematic view of an electronic device according to an embodiment of the disclosure.

Referring to FIG. 15, FIG. 15 is a schematic view of an electronic device according to an embodiment of the disclosure. In this embodiment, an electronic device 200 at least includes electronic circuit groups GU1 to GUn, the scan line LS, the scan signal conversion circuits 110_1 to 110_n, and a scan driving circuit 220.

In this embodiment, each of the electronic circuit groups GU1 to GUn includes one or more electronic circuits. Implementation details of the electronic circuit have been clearly described in the embodiment of FIG. 2, and thus will not be repeated in the following.

The scan driving circuit 220 is electrically connected to the scan line LS. The scan driving circuit 220 generates the first scan signal SS and provides the first scan signal SS to the scan line LS.

The scan signal conversion circuit 110_1 is electrically connected to the scan line LS and the electronic circuit group GU1. The scan signal conversion circuit 110_1 receives the first scan signal SS located on the scan line LS, and converts the first scan signal SS into the second scan signal SS1'. The scan signal conversion circuit 110_1 provides the second scan signal SS1' to the electronic circuit in the electronic circuit group GU1.

The scan signal conversion circuit 110_2 is electrically connected to the scan line LS1 and the electronic circuit group GU2. The scan signal conversion circuit 110_2 receives the first scan signal SS located on the scan line LS1, and converts the first scan signal SS into the second scan signal SS2'. The scan signal conversion circuit 110_2 provides the second scan signal SS2' to the electronic circuit in the electronic circuit group GU2.

Similarly, the scan signal conversion circuit 110_n is electrically connected to the scan line LS1 and the electronic circuit group Gun. The scan signal conversion circuit 110_n receives the first scan signal SS located on the scan line LS1, and converts the first scan signal SS into the second scan signal SSn'. The scan signal conversion circuit 110_n provides the second scan signal SSn' to the electronic circuit in the electronic circuit group Gun.

Figure 16:
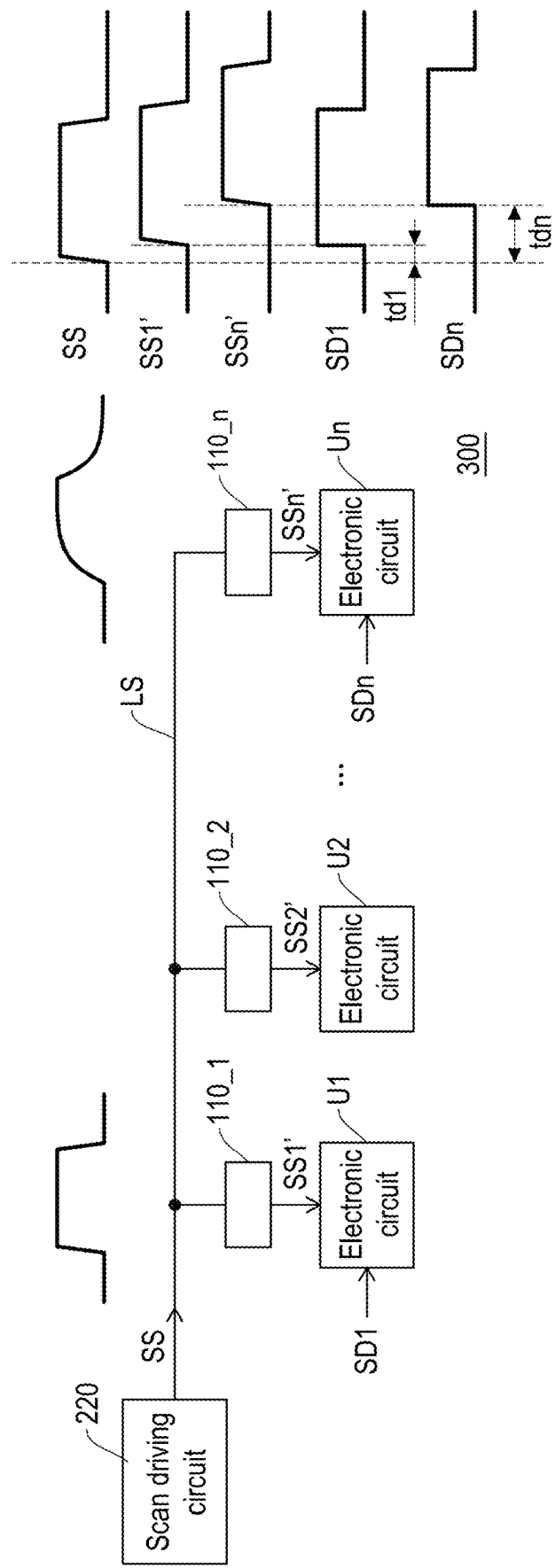
FIG. 16 is a schematic view of an electronic device according to an embodiment of the disclosure.

Referring to FIG. 16, FIG. 16 is a schematic view of an electronic device according to an embodiment of the disclosure. In this embodiment, an electronic device 300 at least includes the electronic circuits U1 to Un, the scan line LS1, the scan signal conversion circuits 110_1 to 110_n, and the scan driving circuit 220. Implementation details of the electronic circuits U1 to Un have been clearly described in the embodiment of FIG. 2, and thus will not be repeated in the following.

The scan driving circuit 220 is electrically connected to the scan line LS1. The scan driving circuit 220 generates the first scan signal SS and provides the first scan signal SS to the scan line LS1.

The scan signal conversion circuit 110_1 is electrically connected to the scan line LS1 and the electronic circuit U1. The scan signal conversion circuit 110_1 receives the first scan signal SS located on the scan line LS1, and converts the first scan signal SS into the second scan signal SS'. The scan signal conversion circuit 110_1 provides the second scan signal SS' to the electronic circuit U1.

Similarly, the scan signal conversion circuit 110_n is electrically connected to the scan line LS1 and the electronic circuit Un. The scan signal conversion circuit 110_n receives the first scan signal SS located on the scan line LS1, and converts the first scan signal SS into the second scan signal SS'. The scan signal conversion circuit 110_n provides the second scan signal SS' to the electronic circuit Un.

In this embodiment, the second scan signal SS' has a delay compared to the first scan signal SS generated by the scan driving circuit 220. Taking the electronic circuit U1 as an example, the second scan signal SS' received by the electronic circuit U1 has a scan delay td1 compared to the first scan signal SS generated by the scan driving circuit 220. Taking the electronic circuit Un as an example, the second scan signal SS' received by the electronic circuit Un has a scan delay tdn compared to the first scan signal SS generated by the scan driving circuit 220. The scan delay tdn is greater than the scan delay td1. As a result, the second scan signal SS' received by the electronic circuit Un lags behind the second scan signal SS' received by the electronic circuit U1.

The scan delay td1 depends on a transmission delay of the scan line LS1 (i.e., an RC delay of the scan line LS1) and a conversion delay of the scan signal conversion circuit 110_1. The scan delay tdn depends on the transmission delay of the scan line LS1 (i.e., the RC delay of the scan line LS1) and a conversion delay of the scan signal conversion circuit 110_n.

Therefore, a data signal SD1 provided to the electronic circuit U1 is delayed based on the scan delay td1. A data signal SDn provided to the electronic circuit Un is delayed based on the scan delay tdn. The data signal SD1 has the scan delay td1. The data signal SDn has the scan delay tdn. In this way, during a period when the electronic circuit U1 is selected, the electronic circuit U1 may surely receive the data signal SD1. During a period when the electronic circuit Un is selected, the electronic circuit Un may surely receive the data signal SDn.

Based on the above, the scan signal conversion circuit may adjust the first scan signal located on the scan line to the second scan signal. The electronic circuit receives the second scan signal. In this way, the operation of the electronic circuit is not abnormal due to the delay or distortion of the first scan signal. In addition, in some embodiments, the second scan signal has the scan delay compared to the first scan signal generated by the scan driving circuit. The data signal is delayed based on the scan delay. In this way, during the period when the electronic circuit is selected, the electronic circuit may surely receive the data signal.

Lastly, it is to be noted that: the embodiments described above are only used to illustrate the technical solutions of the disclosure, and not to limit the disclosure; although the disclosure is described in detail with reference to the embodiments, those skilled in the art should understand: it is still possible to modify the technical solutions recorded in the embodiments, or to equivalently replace some or all of the technical features; the modifications or replacements do not cause the essence of the corresponding technical solutions to deviate from the scope of the technical solutions of the embodiments.

What is claimed is:

1. An electronic device, wherein the electronic device comprises:
   at least one electronic circuit;
   a scan line configured to transmit a first scan signal; and
   a scan signal conversion circuit electrically connected to the at least one electronic circuit and the scan line, configured to receive the first scan signal, converting the first scan signal into a second scan signal, and providing the second scan signal to the at least one electronic circuit,
   wherein the scan signal conversion circuit is implemented by one of an analog buffer and an analog amplifier.

2. The electronic device according to claim 1, wherein the scan signal conversion circuit comprises:
   a switch, wherein a first end of the switch is electrically connected to a reference high voltage, a second end of the switch is electrically connected to the at least one electronic circuit, and a control end of the switch receives the first scan signal; and
   a current source electrically connected between the second end of the switch and a reference low voltage,
   when a voltage value of the first scan signal is a high voltage value, the switch is turned on, and
   when the voltage value of the first scan signal is a low voltage value, the switch is turned off.

3. The electronic device according to claim 2, wherein the current source comprises:
   a resistor electrically connected between the second end of the switch and the reference low voltage.

4. The electronic device according to claim 2, wherein the current source comprises:
   an N-type transistor, wherein a first end of the N-type transistor is electrically connected to a control end of the N-type transistor and the second end of the switch, and a second end of the N-type transistor is electrically connected to the reference low voltage.

5. The electronic device according to claim 1, wherein the scan signal conversion circuit comprises:
   an operational amplifier, wherein a first input end of the operational amplifier receives the first scan signal, and a second input end of the operational amplifier is electrically connected to an output end of the operational amplifier and the at least one electronic circuit.

6. The electronic device according to claim 1, wherein the scan signal conversion circuit comprises:
   a switch, wherein a first end of the switch is electrically connected to the at least one electronic circuit, a second end of the switch is electrically connected to a reference low voltage, and a control end of the switch receives the first scan signal; and
   a current source electrically connected between a reference high voltage and the first end of the switch,
   when a voltage value of the first scan signal is a high voltage value, the switch is turned on, and
   when the voltage value of the first scan signal is a low voltage value, the switch is turned off.

7. The electronic device according to claim 6, wherein the current source comprises:
   a resistor electrically connected between the reference high voltage and the first end of the switch.

8. The electronic device according to claim 6, wherein the current source comprises:
   an N-type transistor, wherein a first end of the N-type transistor is electrically connected to a control end of the N-type transistor and the reference high voltage, and a second end of the N-type transistor is electrically connected to the second end of the switch.

9. The electronic device according to claim 1, wherein the scan signal conversion circuit comprises:
   a first resistor, wherein a first end of the first resistor receives the first scan signal;
   an operational amplifier, wherein a first input end of the operational amplifier is electrically connected to a second end of the first resistor, a second input end of the operational amplifier is electrically connected to a reference low voltage, and an output end of the operational amplifier is electrically connected to the at least one electronic circuit; and
   a second resistor electrically connected between the first input end of the operational amplifier and the output end of the operational amplifier.

10. The electronic device according to claim 1, wherein the scan signal conversion circuit comprises:
    an operational amplifier, wherein a first input end of the operational amplifier receives the first scan signal, and an output end of the operational amplifier is electrically connected to the at least one electronic circuit;
    a first resistor electrically connected between a second input end of the operational amplifier and a reference low voltage; and
    a second resistor electrically connected between the second input end of the operational amplifier and the output end of the operational amplifier.

11. The electronic device according to claim 1, wherein each of the at least one electronic circuit comprises:
    an electronic element; and
    a selection circuit electrically connected to the scan signal conversion circuit and the electronic element, configured to receive the second scan signal and a data signal, and providing the data signal to the electronic element according to the second scan signal, such that the electronic element operates according to the data signal.

12. The electronic device according to claim 11, wherein the electronic device further comprises:
    a scan driving circuit electrically connected to the scan line, configured to generate the first scan signal, and providing the first scan signal to the scan line,
    wherein the second scan signal has a scan delay compared to the first scan signal generated by the scan driving circuit, and
    wherein the data signal is delayed based on the scan delay.

* * * * *